J. BATTENFELD.
FASTENER.
APPLICATION FILED MAY 3, 1910.
991,192.
Patented May 2, 1911.
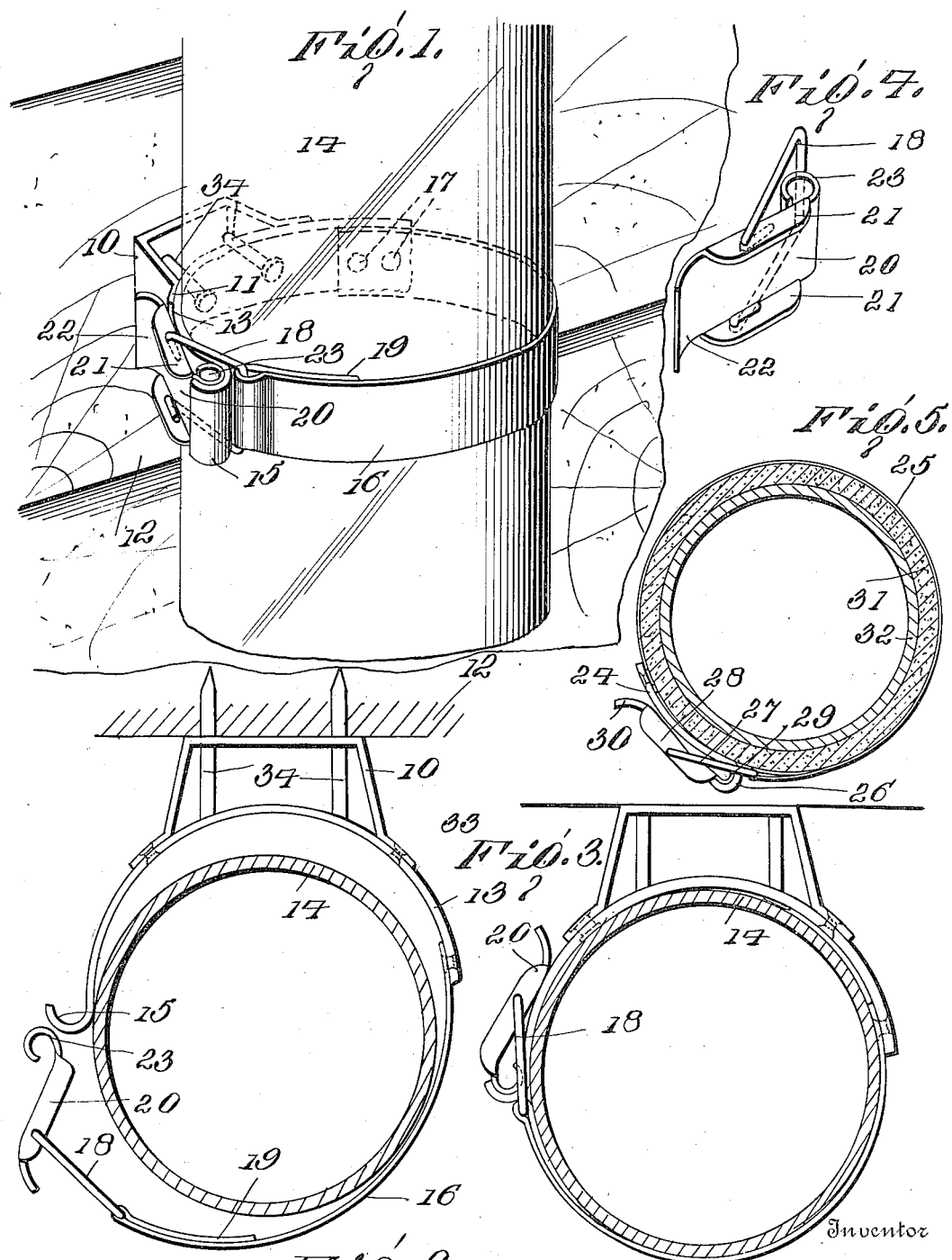
Witnesses
Inventor
John Battenfeld
By ... Attorneys

UNITED STATES PATENT OFFICE.

JOHN BATTENFELD, OF MARION, OHIO.

FASTENER.

991,192.      Specification of Letters Patent.      Patented May 2, 1911.

Application filed May 3, 1910. Serial No. 559,427.

*To all whom it may concern:*

Be it known that I, JOHN BATTENFELD, a citizen of the United States, residing at Marion, in the county of Marion and State of Ohio, have invented certain new and useful Improvements in Fasteners, of which the following is a specification.

This invention relates to fastening devices, and refers particularly to a device for supporting pipes and all other adaptable objects, packing about pipes, and the like.

The invention comprehends a fastener formed of a band having a contracting and swinging member adjustably secured across its ends to retain the band about any adaptable object to be secured or supported.

An object of this invention is to form a device of this nature by means of which pipes are quickly secured in position, as for instance, drain pipes for gutters or buildings, and are quickly detached when it is desired to remove the pipes or for making repairs to the same.

Another important feature of this invention is to form a fastener adaptable to pipes varying in diameter so that it is not necessary to provide different sizes of fasteners corresponding to the size of the pipes employed.

For a full understanding of the invention reference is to be had to the following description and accompanying drawing, in which:—

Figure 1 is a perspective view of the improved fastener disclosed as supporting a section of pipe against a wall, or the like. Fig. 2 is a top plan view of the improved device showing a section of the pipe therein, and in a partly closed position. Fig. 3 is a similar view disclosing the fastener in a closed position. Fig. 4 is a detail perspective view of the locking member employed, and Fig. 5 is a slightly modified form of the fastener for securing packing about pipes.

Corresponding and like parts are referred to in the following description and indicated in all the views of the accompanying drawing by the same reference characters.

Referring to the drawing, the numeral 10 designates a bracket which is formed from a comparatively thick strip of metal bent into U-form and having outturned flanges 11 upon its extremities. The base of the bracket 10 is seated against a wall 12, or a like support, to extend the arms of the bracket outwardly at right angles thereto. A receiving member 13 is positioned across the outer end of the bracket 10, and is in the form of an arcuate strip of metal which is of sufficient thickness to resist bending under ordinary circumstances, and receiving therein the pipe 14. One end of the receiving member 13 is turned outwardly and backwardly to form a socket 15 for a purpose hereinafter set forth. The opposite end of the receiving member 13 carries a band 16 of metal which is comparatively thin so as to admit of the flexibility of the band, the band 16 being secured to the receiving member 13 by rivets 17, or the like.

The locking member which is employed for securing the band about the pipe 14 comprises a bail 18 which is secured to the band 16 by wrapping the extremity of the band about one end of the bail. The overlapped end 19 of the band is positioned against the inner face of the band and engaged between the same and the outer face of the pipe 14. The outer end of the bail 18 carries a thumb-lever 20 which is hinged thereon. The lever 20 is formed from a sheet of metal which is stamped to provide flanges 21 at the opposite longitudinal edges thereof and through which the bail 18 is positioned. The free ends of the bail are passed through the flanges 21 and turned inwardly against the inner opposite sides of the same. The outer end of the lever 20 is curved to form a lip 22 for the reception of the thumb of the operator, or a suitable instrument to raise the lever in the operation of the device. The inner end of the lever 20 is rolled over to form a head 23 corresponding to the socket 15 and into which the head is engaged.

The device which is disclosed in Fig. 5 is formed of a heavy strip 24 which forms the receiving member and which carries a flexible band 25 and a socket 26 at its opposite ends. The band 25 is provided with a bail 27 which is secured thereto by the turning over of the free extremity of the band about the bail. The bail carries upon its free ends a lock or thumb lever 28 which carries upon its inner end a head 29 to engage within the socket 26. A lip 30 is formed upon the outer end of the lever 28 to actuate the same. The modified form of the device which is disclosed in Fig. 5 is supported about a packing 31 wrapped about a pipe 32. In this instance the bracket is eliminated and the band 25 is engaged about the packing 31 at any point desired.

In the operation of the device, the band 16 is bent outwardly to admit the pipe 14 into the receiving member 13. The band is now engaged about the outer face of the pipe 14 when the head 22 is engaged in the socket and the lever 20 swung thereover to bind the band 16 against the pipe and to retain the outer end of the lever 20 against the side of the receiving member 17. This position of the device is disclosed in Fig. 3 where the line of draft between the ends of the bail 18 passes inwardly from the points of engagement between the socket 15 and the head 23. To release the pipe 14 the lever 20 is swung outwardly and the band 16 is drawn from the pipe 14.

It will be observed that the receiving member 13 is secured to the bracket 10 through the medium of rivets 33 and that the receiving member is further reinforced by the passage of the nails 34, or similar fastening devices therethrough. The nails 34 are passed inwardly from the receiving member 13 through the bracket 10 to engage within the support 12.

The hook or fastening device herein set forth may be employed without the band, the interlocking member of the hook being attached to the edges or ends of objects which are to be held together.

Having thus described the invention what is claimed as new is:—

A fastener including a U-shaped bracket with outwardly diverging arms having outturned flanges at their extremities, a rigid arcuate receiving member engaging across the outer ends of the arms and seating against the flanges and having an overturned end to form a socket, fastening devices passing inwardly through the receiving member and the central portion of said U-shaped bracket to secure the same against a suitable support, a flexible band carried at its inner end upon the opposite end of the receiving member, a bail engaging loosely over the outer end of the band, the end of the band being turned inwardly through the bail and engaging between the band and an object supported in the receiving member, and a locking member carried by the bail for engagement within the socket to bind the flexible band about the object in the receiving member.

In testimony whereof, I affix my signature in presence of two witnesses.

JOHN BATTENFELD. [L. S.]

Witnesses:
   FRENCH CROW,
   ALICE M. CROW.